US011961501B2

(12) United States Patent
Ban et al.

(10) Patent No.: US 11,961,501 B2
(45) Date of Patent: Apr. 16, 2024

(54) NOISE REDUCTION METHOD AND DEVICE

(71) Applicant: Lenovo (Beijing) Limited, Beijing (CN)

(72) Inventors: Xueli Ban, Beijing (CN); Qihua Xiao, Beijing (CN); Yanbo Ni, Beijing (CN); Zhou Yu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 22 days.

(21) Appl. No.: 17/548,609

(22) Filed: Dec. 13, 2021

(65) Prior Publication Data

US 2022/0301533 A1 Sep. 22, 2022

(30) Foreign Application Priority Data

Mar. 22, 2021 (CN) ........................ 202110301973.9

(51) Int. Cl.
*G10K 11/16* (2006.01)

(52) U.S. Cl.
CPC .................................... *G10K 11/16* (2013.01)

(58) Field of Classification Search
CPC ............. H04R 1/1083; H04R 2410/05; H04R 2430/23; H04R 2460/01; H04R 2430/21; H04R 5/033; H04R 2410/01; G10L 21/0208; G10L 2021/02166; G10L 25/78; G10L 2021/02082; G10L 25/84; G10L 2015/088; G10L 21/0364; G10L 21/02; G10K 11/16; G10K 2210/108; H04M 9/082; H04M 9/08; H04S 2400/15; H04S 7/303; H04S 2400/11
USPC ........ 381/92, 94.1, 71.1, 71.11, 356, 57, 58, 381/73.1, 13, 317
See application file for complete search history.

(56) References Cited

U.S. PATENT DOCUMENTS

| | | | | |
|---|---|---|---|---|
| 2002/0172350 | A1* | 11/2002 | Edwards | G10L 21/02 704/E21.007 |
| 2014/0056435 | A1* | 2/2014 | Kjems | G10L 15/20 381/317 |
| 2015/0050967 | A1* | 2/2015 | Bao | H04M 9/082 455/570 |
| 2016/0125869 | A1* | 5/2016 | Kulavik | H04S 7/00 381/71.1 |
| 2017/0354796 | A1* | 12/2017 | Gussen | G10K 11/17875 |

FOREIGN PATENT DOCUMENTS

| | | | |
|---|---|---|---|
| CN | 111182416 | A | 5/2020 |
| CN | 111402915 | A | 7/2020 |

* cited by examiner

*Primary Examiner* — Norman Yu
(74) *Attorney, Agent, or Firm* — ANOVA LAW GROUP, PLLC

(57) ABSTRACT

Noise reduction method and device are provided. The method includes: obtaining different audio signals respectively collected by two audio collection devices, where one of the two audio collection devices has a specific positional relationship with an effective audio source; at least according to the different audio signals respectively collected by the two audio collection devices, determining effective signals corresponding to the effective audio source and noise signals corresponding to a noise source and obtaining determination results; and performing a noise reduction process on the audio signals collected by at least one of the two audio collection devices to retain the effective signals and reduce the noise signals, according to the determination results.

20 Claims, 9 Drawing Sheets

NOISE REDUCTION METHOD AND DEVICE

CROSS-REFERENCE TO RELATED APPLICATION

This application claims the priority of Chinese Patent Application No. 202110301973.9, filed on Mar. 22, 2021, the content of which is incorporated herein by reference in its entirety.

TECHNICAL FIELD

The present disclosure generally relates to the field of audio processing and, more particularly, relates to a noise reduction method and device.

BACKGROUND

When two communication parties use mobile phones, notebooks, or other electronic devices for voice communication, if the environment is relatively noisy, peripheral noises will often be collected, which will affect the listening effect of the other party and reduce the quality of voice communication. Therefore, it is necessary to provide an effective noise reduction method to improve the quality of collected audio and correspondingly improve the voice communication quality in voice communication and other scenarios.

SUMMARY

One aspect of the present disclosure provides a noise reduction method. The method includes: obtaining different audio signals respectively collected by two audio collection devices, where one of the two audio collection devices has a specific positional relationship with an effective audio source; at least according to the different audio signals respectively collected by the two audio collection devices, determining effective signals corresponding to the effective audio source and noise signals corresponding to a noise source and obtaining determination results; and performing a noise reduction process on the audio signals collected by at least one of the two audio collection devices to retain the effective signals and reduce the noise signals, according to the determination results.

Another aspect of the present disclosure provides an electronic device including an acquisition module, a determination module, and a noise reduction module. The acquisition module is configured to obtain different audio signals collected by two audio collection devices respectively. One of the two audio collection devices has a specific positional relationship with an effective audio source. The determination module is configured to determine effective signals corresponding to the effective audio source and noise signals corresponding to a noise source and obtain determination results, at least according to the different audio signals respectively collected by the two audio collection devices. The noise reduction module is configured to perform noise reduction on the different audio signals collected by two audio collection devices respectively to retain the effective signals and reduce the noise signals, according to the determination results.

Another aspect of the present disclosure provides a non-transitory computer-readable storage medium, containing program instructions for, when executed by a processor, performing a noise reduction method. The method includes: obtaining different audio signals respectively collected by two audio collection devices, where one of the two audio collection devices has a specific positional relationship with an effective audio source; at least according to the different audio signals respectively collected by the two audio collection devices, determining effective signals corresponding to the effective audio source and noise signals corresponding to a noise source and obtaining determination results; and performing a noise reduction process on the audio signals collected by at least one of the two audio collection devices to retain the effective signals and reduce the noise signals, according to the determination results.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
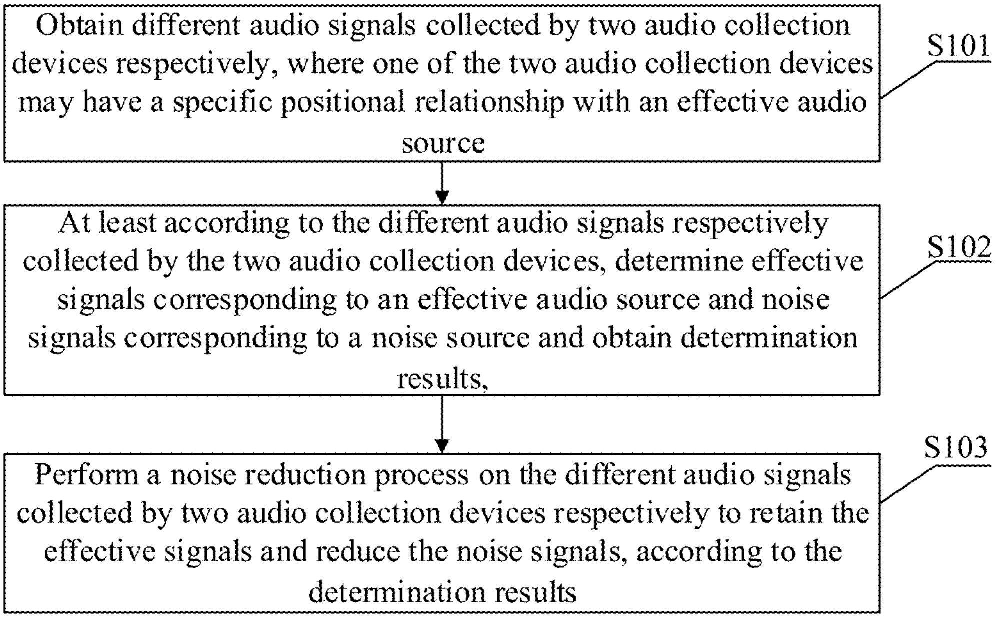
FIG. 1 illustrates an exemplary noise reduction method consistent with various disclosed embodiments of the present disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the disclosure. Furthermore, a three-dimensional (3D) size including length, width, and depth should be considered during practical fabrication.

The present disclosure provides a noise reduction method and device, which may be used for noise reduction and/or noise cancellation of collected audio signals to improve the quality of the audio signals. The method or device may be applied to electronic devices, and the electronic devices may include, but are not limited to, various smart terminals or computers such as smartphones, tablets, notebooks, all-in-ones, or conference equipment with data process functions.

One embodiment of the present disclosure provides a noise reduction method. As shown in FIG. 1, in one embodiment, the noise reduction method may include S101 to S103.

In S101, different audio signals collected by two audio collection devices respectively may be obtained. One of the two audio collection devices may have a specific positional relationship with an effective audio source.

One of the two audio collection devices may be, but is not limited to, a built-in mic of an electronic device, a mic of an external earphone, or a recording device such as a voice recorder set in a corresponding position.

That one of the two audio collection devices may have a specific positional relationship with the effective audio source, optionally, may include any one of:

1) The relative position of the one of the two audio collection devices with respect to the effective audio source is fixed, and could move synchronously with the movement of the effective audio source;

For example, the one of the two audio collection devices may be a mic on a headset worn by a speaker who uses a mobile phone or notebook for voice communication, a mic on a bracelet or smartwatch worn by a speaker, or a mic worn by the speaker in a conference scene.

2) A distance between the one of the two audio collection devices and the effective audio source is less than a set threshold;

For example, the audio collection device may be a recording pen fixed within a predetermined distance around a speaker in a conference scene.

In S101, the different audio signals collected by the two audio collection devices may be obtained. Specifically, different audio signals collected by two audio collection devices at the same time may be obtained. In the presence of a noise source, the audio signals collected by the two audio collection devices may be mixed audio signals that include both the effective signals of the effective audio source and the noise signals of the noise source.

In S102, the effective signals corresponding to the effective audio source and the noise signals corresponding to the noise source may be determined to obtain determination results, at least according to the different audio signals respectively collected by the two audio collection devices.

In the present disclosure, a prerequisite for realizing the noise reduction may be performing audio signal collection based on the two audio collection devices, and that the one of the two audio collection devices and the effective audio source have any one of the above-mentioned specific positional relationships. As a result of the characteristic positional relationship, the one of the two audio collection devices may have the characteristic of being relatively close to the effective audio source, while another of the two audio collection devices may be relatively far away from the effective audio source. For description purposes only, the one of the two audio collection devices relatively close to the effective audio source will be referred to as the first audio collection device, and another of the two audio collection devices relatively far away from the effective audio source will be referred to as the second audio collection device.

In one embodiment, a distance D2 between the effective audio source and the second audio collection device may be much larger than a distance D1 between the effective audio source and the first audio collection device, that is,

D2/D1>>1.

Figure 2:
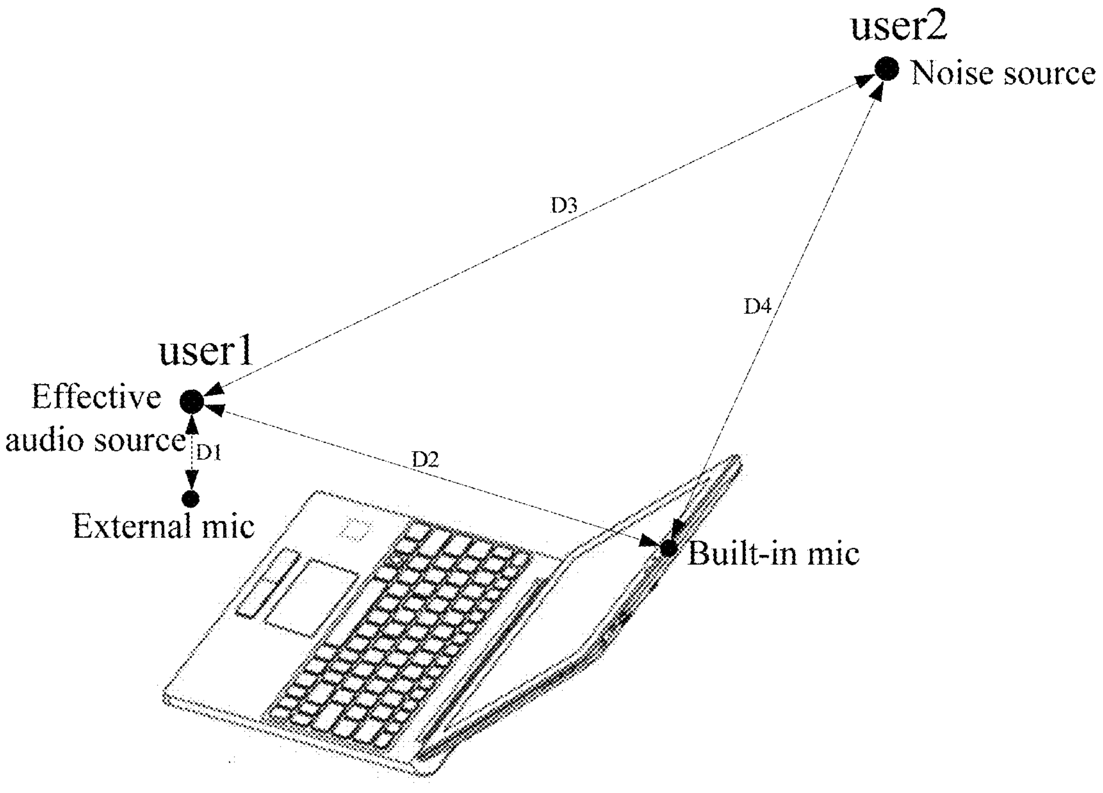
FIG. 2 illustrates an exemplary application scenario consistent with various disclosed embodiments in the present disclosure.

For example, for a mobile phone/notebook-based voice communication scenario, the first audio collection device of the two audio collection devices may be a mic on a headset worn by the user, and the second audio collection device may be a built-in mic of the mobile phone/laptop or other electronic devices, as shown in FIG. 2. In this scenario, the distance between the effective audio source (user1's mouth) and the built-in mic of the device may be much larger than the distance between the effective audio source the mic on the external headset.

For another example, in a conference scene, the first audio collection device of the two audio collection devices may be a mic worn by the speaker or a recording device fixedly set within a predetermined distance near the speaker, and the second audio collection device may be a recording device set relatively far away from the speaker. A distance between the speaker and the recording device set relatively far away may be far larger than a distance from the mic (or the recording device set up close).

In practical applications, as long as the two audio collection devices and the effective audio source have the above-mentioned positional relationship, there is no need to limit the specific implementation form of the two audio collection devices. For example, in a mobile phone/notebook-based voice communication scenario, the two audio collection devices may also be external mics of electronic devices such as notebooks, where one mic is the mic worn by the speaker, and the other mic is relatively far away from the speaker.

And, relatively, the distance between the noise source and the two audio collection devices may be relatively close, that is, a ratio between a distance D4 between the noise source and the second audio collection device and a distance D3 between the noise source and the first audio collection device may approach 1:

D4/D3→1.

It is easy to understand that this positional relationship (D4/D3→1) may be highly consistent with the actual positional relationship between the noise source and the two audio collection devices in the actual application scenario. For details, please refer to the positional relationship between the noise source (the mouse of user2) and the mic of the earphone worn by user1 or the built-in mic of user1's notebook.

Based on the above-mentioned positional relationship (D2/D1>>1, D4/D3→1) between the effective audio source, the noise source and the two audio collection devices, in the signal waveforms of the audio signals collected by the two audio collection devices, an effective signal part (effective signals) of the audio source may have a large variation in the amplitude (representing the volume/loudness) of the signal waveforms corresponding to the two audio collection devices. In contrast, a signal part of the noise source (noise signals) may have a small difference in the amplitude of the signal waveforms corresponding to the two audio collection devices, as shown by the amplitude difference between the voice signals (effective signals) in the audio signals of the two mics and the amplitude difference between the waveforms of the noise signals in FIG. 3A and FIG. 3B.

In the present disclosure, based on the significant difference between the amplitude variation of the waveforms produced by the effective audio signal parts and the signal parts of the noise source in the two audio collection devices respectively, S102 may be used to determine the effective signals corresponding to the effective audio source and the noise signals corresponding to the noise source.

In S103, according to the determination results, noise reduction may be performed on the audio signals collected by at least one of the two audio collection devices, to retain the effective signals and reduce the noise signals.

According to the determined effective signals corresponding to the effective audio source and the noise signals corresponding to the noise source, the noise reduction may be performed on the audio signals collected by at least one of the two audio collection devices. For example, the audio signals collected by the second audio collection device may be used as reference signals, to perform the noise reduction on the audio signals collected by the first audio collection device to retain the effective signals and reduce the noise signals.

In the noise reduction method provided in this embodiment, the different audio signals collected by the two audio collection devices (one of the two audio collection devices may have a specific positional relationship with the effective audio source) may be obtained. The effective signals corresponding to the effective audio source and the noise signals corresponding to the noise source may be determined to obtain determination results, at least according to the different audio signals respectively collected by the two audio collection devices. According to the determination results, the noise reduction may be performed on the audio signals collected by at least one of the two audio collection devices, to retain the effective signals and reduce the noise signals. The effect of noise reduction on the collected audio signals may be achieved, which may effectively improve the quality of the collected audio signals. Therefore, the quality of the voice communication in the voice communication scene may be improved.

Figure 4:
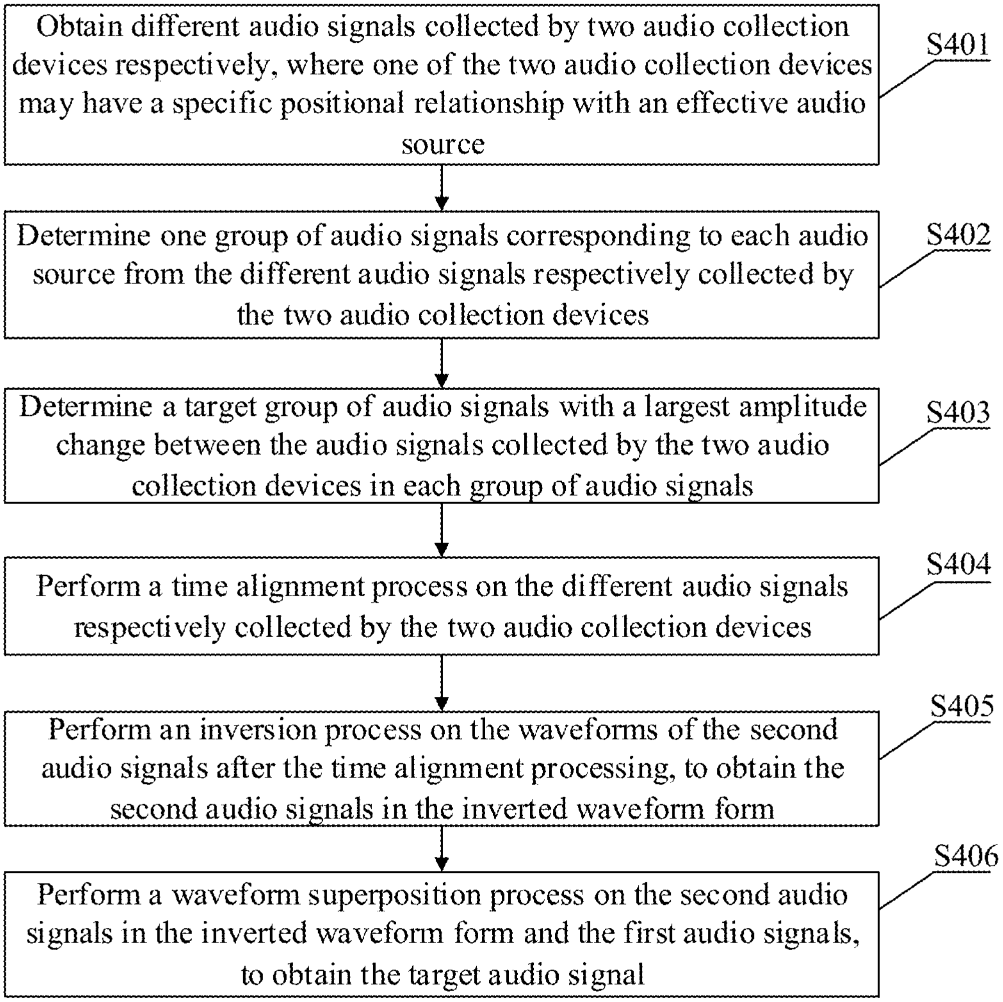
FIG. 4 illustrates another exemplary noise reduction method consistent with various disclosed embodiments in the present disclosure.

One embodiment of the present disclosure provides another noise reduction method. As shown in FIG. 4, the noise reduction method may include S401 to S406.

In S401, different audio signals respectively collected by two audio collection devices may be obtained. One of the two audio collection devices may have a specific positional relationship with an effective audio source.

S401 may be same as S101 and may refer to the description of S101.

In S402, one group of audio signals corresponding to each audio source may be determined from the different audio signals respectively collected by the two audio collection devices.

In the presence of a noise source, one group of audio signals corresponding to the effective audio source may be determined, and at least one group of audio signals corresponding to at least one noise source may be determined. Each group of audio signals may include different audio signals generated by a corresponding audio source in the two audio collection devices.

Figure 3A:
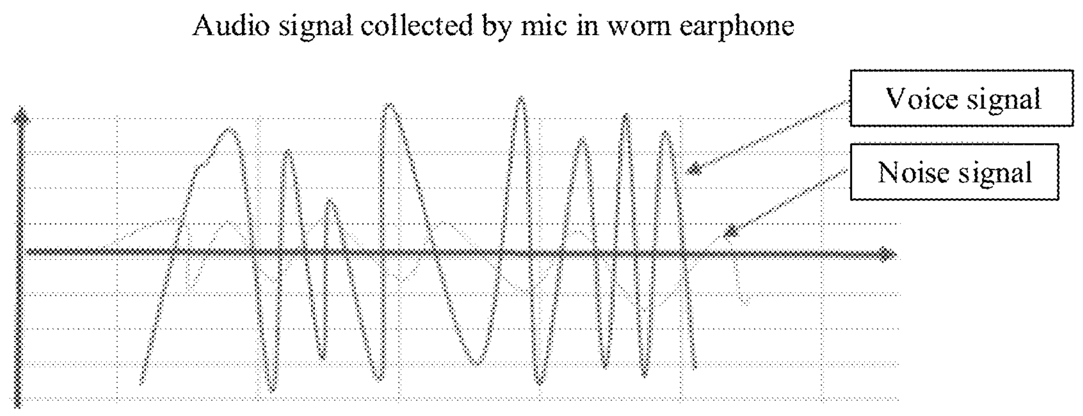
FIG. 3A and FIG. 3B illustrate waveform diagrams of audio signals respectively collected by two audio collection devices consistent with the embodiments of the present disclosure.
Figure 3B:
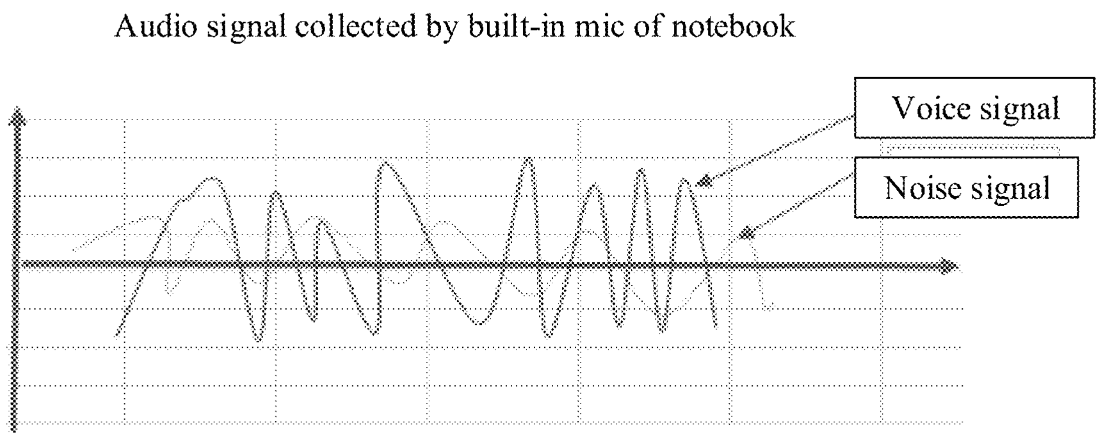

One same audio source may generate audio signals with higher similarity of waveform characteristics in different audio collection devices. As shown in FIG. 3A and FIG. 3B, waveforms of voice signals in the audio signals collected by the two mics may be basically same, and waveforms of the noise signals in the audio signals collected by the two mics may be basically same.

Correspondingly, in the present embodiment, by comparing and matching the signal waveforms of the audio signals collected by the two audio collection devices, two audio signals in the audio signals collected by the two audio collection devices with waveform characteristics meeting similar conditions may be determined to belong to one group of audio signals corresponding to one same audio source.

Optionally, the above similar conditions may include that the matching degree of the signal waveforms of the two audio signals reaches a preset threshold.

In S403, a target group of audio signals with a largest amplitude variation between the audio signals collected by the two audio collection devices in each group of audio signals may be determined. The target group of audio signals may be effective signals corresponding to the effective audio source. Other groups of audio signals except for the target group of audio signals may be the noise signals corresponding to the noise source.

Based on the above-mentioned positional relationship of D2/D1>>1 and D4/D3→1, the signal waveforms corresponding to the signal part of the effective audio source (the effective signals) in the two audio collection devices respectively may have the largest variation in the amplitude (ie, the volume/loudness of the sound), while the signal waveforms corresponding to the signal part of the noise source in the two audio collection devices respectively may have a small difference. Correspondingly, the target group of audio signals with a larget amplitude variation between the audio signals collected by the two audio collection devices in each group of audio signals may be determined as the effective signals corresponding to the effective audio source and signals other than the effective signals may be determined as the noise signals corresponding to the noise source.

In S404, a time alignment process may be performed on the different audio signals respectively collected by the two audio collection devices.

Specifically, the timestamps of the different audio signals collected by the two audio collection devices may be aligned.

In S405: an inversion process may be performed on the waveforms of the second audio signals after the time alignment process, to obtain the second audio signals in the inverted waveform form.

In S406: a waveform superposition process may be performed on the second audio signals in the inverted waveform form and the first audio signals, to obtain target audio signals.

The first audio signals and the second audio signals may be different audio signals collected by the two audio collection devices. The amplitude of the effective signal in the first audio signals may be higher than the amplitude of the effective signal in the second audio signals. For example, in the scenario shown in FIG. 2, the first audio signals may essentially be the audio signals collected by mic1 on the external earphone, and the second audio signals may be audio signals collected by mic2 built in the notebook.

Figure 5:
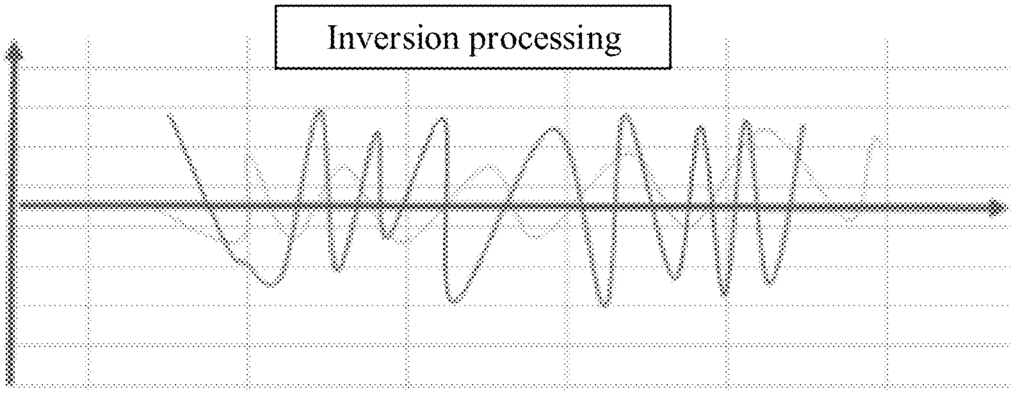
FIG. 5 illustrates a waveform diagram of the audio signal in FIG. 3 after the phase is reversed consistent with the embodiments of the present disclosure.

In S405, performing the inversion process on the waveforms of the second audio signals after the time alignment process may at least include: performing the inversion process on the noise signal in the second audio signals. Taking the audio signals in FIG. 3A and FIG. 3B as examples, the inversion process may be performed on the signal waveform of the overall audio signals (including the effective signal and the noise signal) in FIG. 3B, or the inversion process may be performed on the signal waveform of the noise signal in FIG. 3B. After performing the inversion process on the signal waveform of the overall audio signals in FIG. 3B, the audio signals shown in FIG. 5 may be obtained, and the audio signals may be the second audio signals in the inverted waveform.

Subsequently, the second audio signals in the inverted waveform form and the first audio signals may be further superimposed on the waveforms to obtain the target audio signal. For example, after waveform superposition of the first audio signals shown in FIG. 3A and the second audio signals in the inverted waveform form shown in FIG. 5, the target audio signal shown in FIG. 6 may be obtained.

Compared with the original audio signals collected by the two audio collection devices, the target audio signal may retain the effective signal corresponding to the effective audio source, and at least reduce the noise signal corresponding to the noise source, to achieve noise reduction and noise cancellation in the collected audio signals. The quality of the collected audio signals may be effectively improved, improving the quality of voice communication in scenarios such as voice communication.

Figure 7:
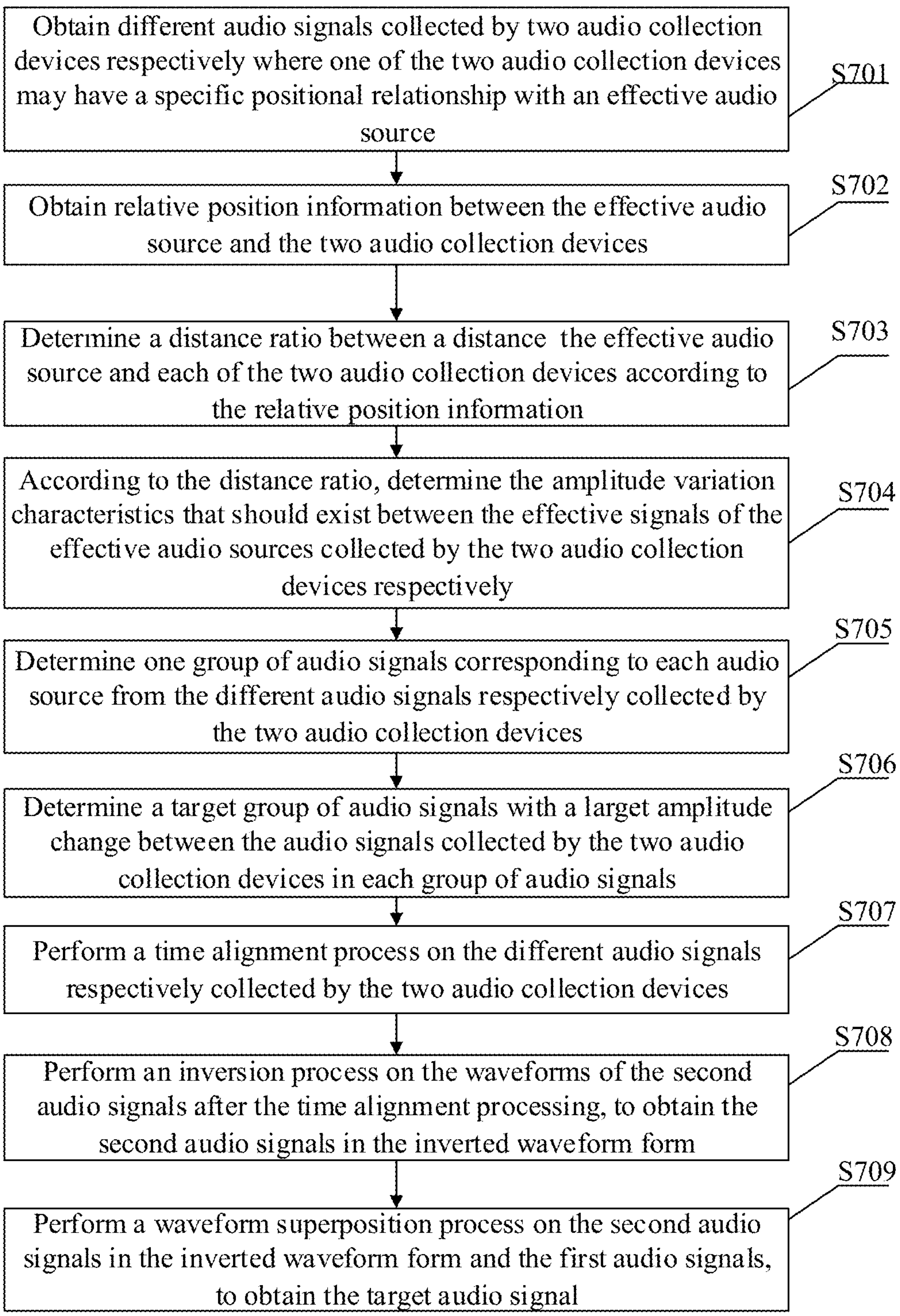
FIG. 7 illustrates another exemplary noise reduction method consistent with various disclosed embodiments in the present disclosure.

In another embodiment shown in FIG. 7, the noise reduction method may include S701 to S709.

In S701, different audio signals respectively collected by two audio collection devices may be obtained. One of the two audio collection devices may have a specific positional relationship with an effective audio source.

S701 may be same as S101 and may refer to the description of S101.

In S702, relative position information between the effective audio source and the two audio collection devices may be obtained.

The relative position information between the effective audio source and the two audio collection devices may at least include a distance between the effective audio source and each of the two audio collection devices.

The relative position information between the effective audio source and the two audio collection devices may be detected based on, but not limited to, any one of image analysis, ultrasonic ranging, infrared ranging, or any combination thereof.

For example, in a scenario where a user uses a notebook for voice communication, a camera on the notebook may be used to collect the user's image information including a worn mic, and then based on image analysis, distances from the user's mouth (the effective audio source) to the worn mic and the notebook's built-in mic may be determined. Or, a bracelet/watch worn by the user (based on the bracelet/watch mic and the notebook built-in mic to achieve noise reduction, the user can put the bracelet/watch near the mouth when speaking) may emit ultrasound or infrared light to the environment, and then the distance between the bracelet/watch and the user's mouth and the distance between the bracelet/watch and the notebook may be determined based on the time difference between the received reflection signals (such as the reflection of the notebook, the reflection of the mouth when speaking) and the transmitted signal to obtain the distance between the user's mouth (the effective audio source) and the mic in the bracelet/watch. Based on the distance between the user's mouth (the effective audio source) and the mic in the bracelet/watch and the distance between the bracelet/watch and the notebook, the distance between the user's mouth (the effective audio source) and the mic in the notebook may be obtained by estimation in advance. After that, the wristband/watch may transmit the detected or estimated distance information to the notebook and other electronic devices for use in the noise reduction of the electronic devices.

For another example, in a conference scene, based on one or more cameras fixedly set in corresponding positions in a conference venue, images of a speaker in the conference venue may be collected, and then distances between the speaker and the two audio collection devices (such as a mic worn by the speaker and another mic fixed at a certain location in the venue) may be determined based on image analysis.

In S703, a distance ratio between distances of the effective audio source with respect to each of the two audio collection devices may be determined according to the relative position information.

Specifically, a first ratio between the distance from the effective audio source to the second audio collection device (such as the built-in mic of the notebook) and the distance from the effective audio source to the first audio collection device (such as the mic worn by the notebook user) may be calculated, or a second ratio between the distance from the effective audio source to the first audio collection device and the distance from the effective audio source to the second audio collection device may be calculated.

In practical applications, the above-mentioned distance ratio (the first ratio or the second ratio) may be a fixed value that does not change with time. For example, in a scenario where a mobile phone/laptop or another electronic device is used for performing the voice communication, relative positions between the user's mouth, the worn mic, and the built-in mic of the device may be relatively fixed, and the first ratio or the second ratio may be correspondingly a fixed value (or, even if there is a change, the change is relatively small and can be ignored). Correspondingly, to reduce the amount of information processing, the detection of the relative position information and the calculation of the distance ratio based on the relative position information may be performed only once when the noise reduction is started. In some other embodiments, the distance ratio may also be a dynamic value that changes with time. For example, in a conference scene, as the speaker keeps moving, the ratio of the distance between his mouth and the mic fixed at a certain position in the conference venue and the distance between his mouth and the mic worn by the speaker may dynamically change. Correspondingly, to ensure subsequent recognition accuracy of the effective signal/noise signal, it may be necessary to detect in real time or periodically and continuously the above-mentioned relative position information at a small time interval and calculate the above-mentioned distance ratio based on the relative position information. During the implementation, the specific situation depends on the scene.

In S704, according to the distance ratio, the amplitude variation characteristics that should exist between the effective signals of the effective audio sources collected by the two audio collection devices respectively may be determined.

Taking the calculated distance ratio as the above-mentioned first ratio as an example, when the value of the first ratio is larger, the amplitude difference between the effective signal waveforms of the effective audio sources collected by the two audio collection devices may be larger. And vice versa, when the value of the first ratio is smaller, the amplitude difference between the effective signal waveforms of the effective audio sources collected by the two audio collection devices may be smaller. Correspondingly, based on the calculated distance ratio, the amplitude variation characteristics of the effective signal waveforms of the effective audio sources collected by the two audio collection devices may be estimated. The amplitude variation characteristics may include a pre-estimated amplitude difference or a pre-estimated amplitude difference range, and the present disclosure has no limits on this.

In S705, one group of audio signals corresponding to each audio source may be determined from the different audio signals respectively collected by the two audio collection devices. Each group of audio signals may include different audio signals generated by a corresponding audio source in the two audio collection devices.

S705 may be same as S402 and, for details, please refer to the description about S402.

In S706, a target group of audio signals with a largest amplitude variation between the audio signals collected by the two audio collection devices in each group of audio signals may be determined. The target group of audio signals may be effective signals corresponding to the effective audio source. Other sets of audio signals except for the target group of audio signals may be the noise signals corresponding to the noise source.

Based on the pre-estimation of the amplitude variation characteristics that should exist in the effective signal waveforms of the effective audio source collected by the two audio collection devices, the amplitude variation characteristics may be further used as a reference to determine a group of audio signals with actual amplitude variation matching the amplitude variation characteristics (ie, the aforementioned target group of audio signals) from each group of audio signals, and may be used as the effective signal corresponding to the effective audio source.

Optionally, in one embodiment, specifically, from each group of audio signals, a group of audio signals with a difference between its amplitude difference and the pre-estimated amplitude difference less than a preset threshold may be determined as the effective signals corresponding to the effective audio source. In another embodiment, from each group of audio signals, a group of audio signals whose amplitude difference is within the pre-estimated amplitude difference range may be determined as the effective signals corresponding to the effective audio source.

In S707, a time alignment process may be performed on the different audio signals respectively collected by the two audio collection devices.

In S708: an inversion process may be performed on the waveforms of the second audio signals after the time alignment process, to obtain the second audio signals in the inverted waveform form.

In S709: a waveform superposition process may be performed on the second audio signals in the inverted waveform form and the first audio signals, to obtain target audio signals.

S707 to S709 may be same as S404 to S406 and, for details, please refer to the description about S404 to 406.

In the present embodiment, based on the positional relationship between different audio sources and different audio collection devices including that the ratio of the distance between the effective audio source to the second audio collection device and the distance to the first audio collection device is far larger than 1 while the ratio of the distance from the noise source to the two audio collection devices approaches 1", recognition of the effective signal and the noise signal and noise reduction may be performed, to achieve a good noise reduction effect under low-cost requirements and effectively improve the quality of the collected audio signal. The quality of voice communication in scenarios such as voice communication may be improved.

Figure 8:
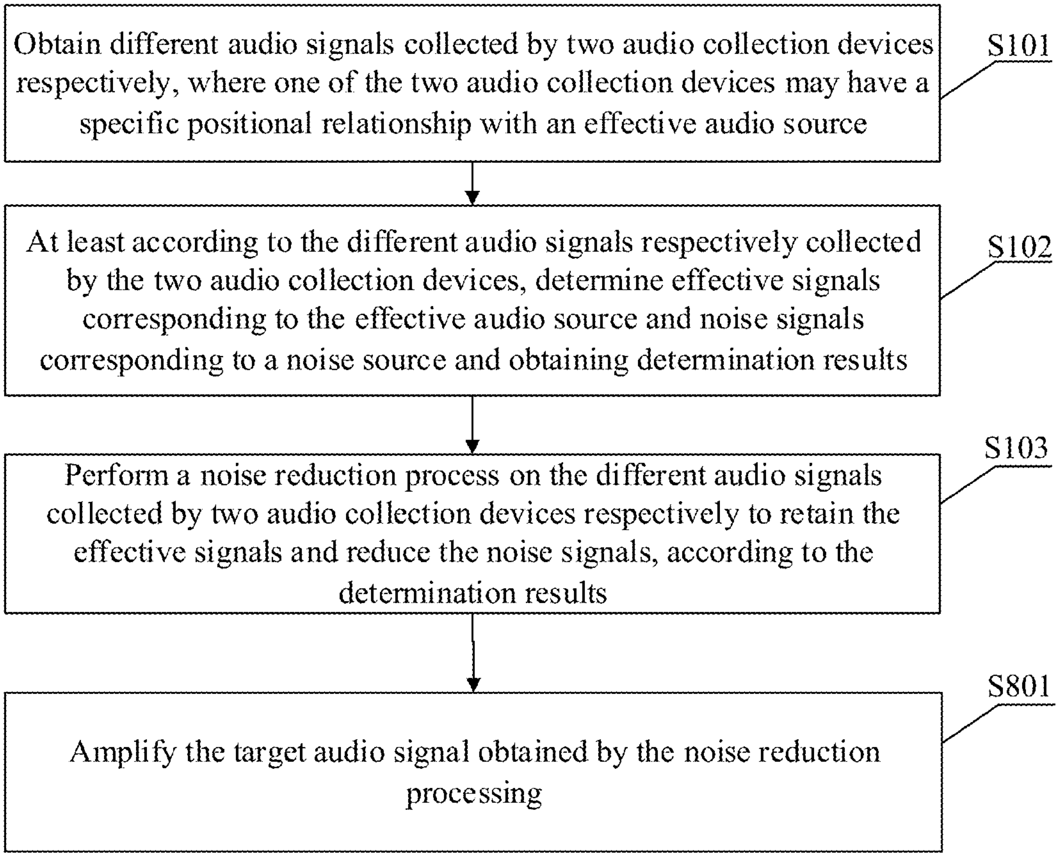
FIG. 8 illustrates another exemplary noise reduction method consistent with various disclosed embodiments in the present disclosure.

In some other embodiments, as shown in FIG. 8, after S103, the noise reduction method may further include:

S801: amplifying the target audio signal obtained by the noise reduction.

Figure 6:
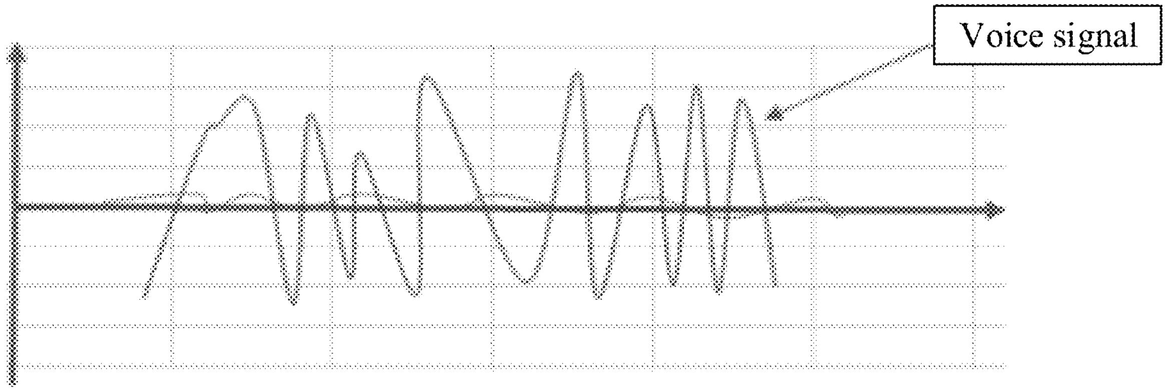
FIG. 6 illustrates a waveform diagram of a target audio signal after noise reduction consistent with various disclosed embodiments in the present disclosure.

After noise reduction is performed based on the audio signals collected by the two audio collection devices to obtain the target audio signal, in comparison with the original audio signal collected by the first audio collection device (close to the effective audio source, such as the mic worn by the speaker), the amplitude of the effective signal part of the obtained target audio signal may have a reduced amplitude, for example, as shown by the comparison of the amplitude of the audio signals in FIG. 3A and FIG. 6. Correspondingly, the target audio signal (where the noise signal has been reduced or the noise signal has been eliminated) may be relatively weak, which will affect the audio listening effect.

To avoid the above situation, in this embodiment, the target audio signal obtained after the noise reduction process may be amplified. Specifically, an audio signal amplifier may be used to amplify the relatively weak target audio signal to a signal with a power or large enough amplitude and a variation characteristic consistent with the original signal. That is, amplifying without distortion may be performed, to ensure the audio effect of the effective audio source.

Figure 9:
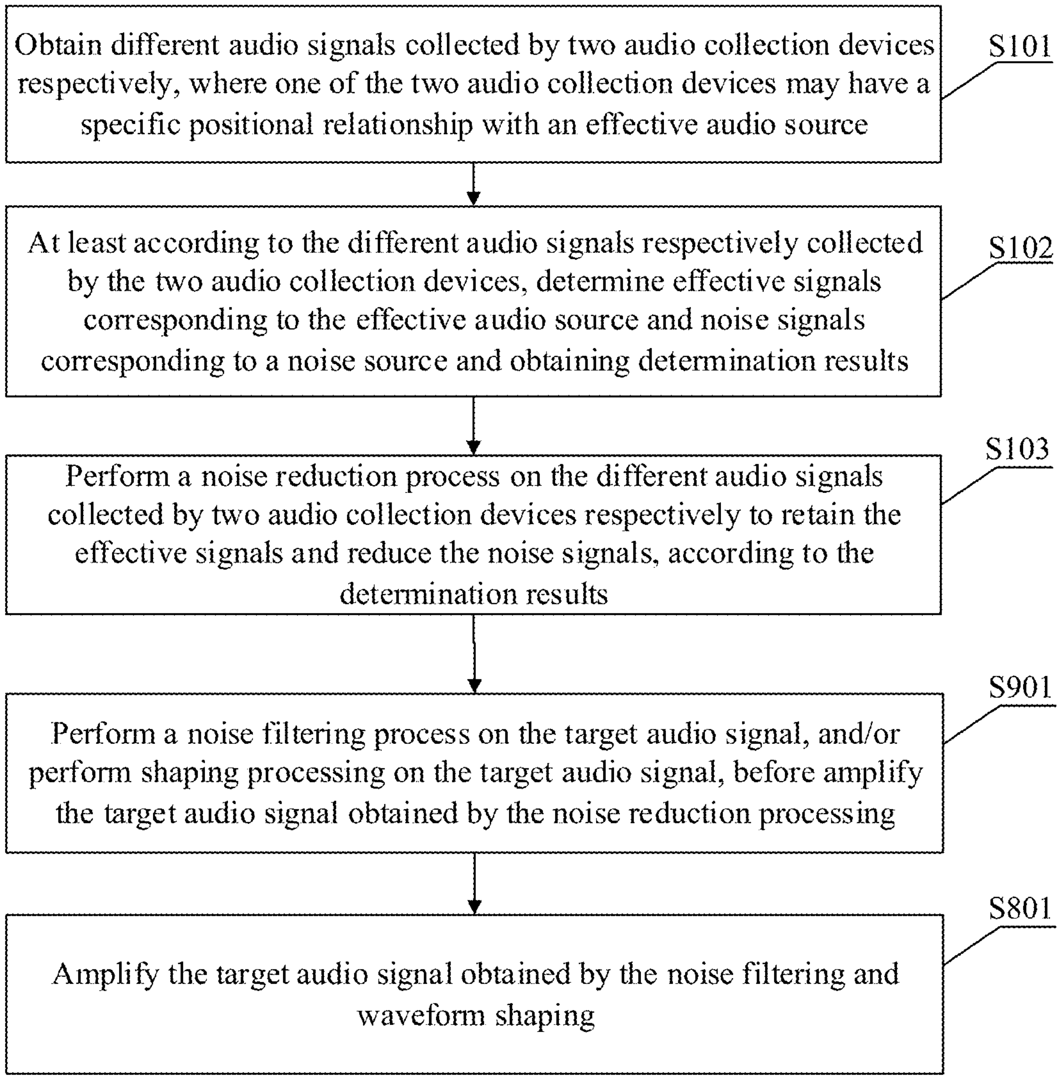
FIG. 9 illustrates another exemplary noise reduction method consistent with various disclosed embodiments in the present disclosure.

In some other embodiments, as shown in FIG. 9, between S103 and S801, the noise reduction method may further include:

S901: performing a noise filtering process on the target audio signal, and/or performing a shaping process on the target audio signal.

After the noise reduction, the target audio signal obtained may include not only the retained effective source signal, but also the weak noise signal. For example, as shown in FIG. 6, the target audio signal obtained after the noise reduction process may still contain a weak noise signal. To further ensure the audio effect of the audio signal obtained after noise reduction, after the target signal is obtained through noise reduction, optionally, the target audio signal may be further subjected to the noise filtering process.

Specifically, it may be determined whether there is a signal part whose amplitude is lower than a preset threshold value in the target audio signal. When the signal part whose amplitude is lower than the preset threshold value exists, it may be filtered out, to realize the noise filtering process on the target audio signal.

Further, in the noise reduction, when the target audio signal is obtained based on the above-mentioned signal superposition process, a certain portion of the effective signal part corresponding to the effective sound source may be abnormal caused by the superposition of the two parts of the signals corresponding to the two audio collection devices. For this situation, after the target signal is obtained through noise reduction, optionally, the target audio signal may also be shaped.

Specifically, it may be determined whether there is a signal part whose waveform satisfies an abnormal condition in the target audio signal. And when the signal part whose waveform satisfies the abnormal condition in the target audio signal exists, the signal part whose waveform satisfies the abnormal condition in the target audio signal may be shaped.

The above abnormal condition may include, but is not limited to: that the waveform of the audio signal includes a portion with abnormal conditions such as glitches and/or sudden changes (reflected in the audio effect, usually produces a slight rubbing sound or a sharp harsh sound). Correspondingly, the signal part in the target audio signal whose waveform satisfies the abnormal condition may be reshaped. Specifically, the part of the waveform with abnormal conditions such as glitches and/or sudden changes may be smoothed.

In this embodiment, by performing the noise filtering and/or shaping process on the target audio signal obtained after noise reduction, various noise signals in the target audio signal (such as weak noise signals from other speakers in the environment and noise signals induced by abnormal signal waveforms (glitches and/or sudden changes) in the noise reduction) may be further eliminated, to further improve the audio quality after noise reduction.

Figure 10:
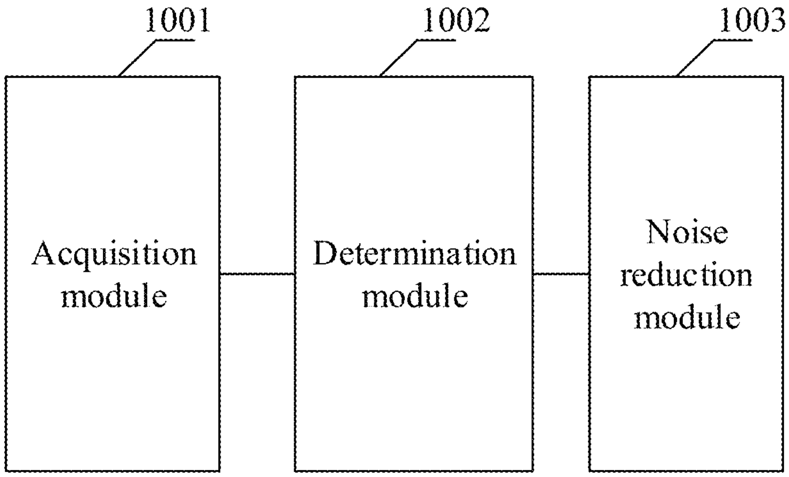
FIG. 10 illustrates an exemplary noise reduction device consistent with various disclosed embodiments in the present disclosure.

The present disclosure provides a noise reduction device. As shown in FIG. 10, in one embodiment, the noise reduction device may include an acquisition module 1001, a determination module 1002, and a noise reduction module 1003.

The acquisition module 1001 may be configured to obtain different audio signals collected by two audio collection devices respectively. One of the two audio collection devices may have a specific positional relationship with an effective audio source.

The determination module 1002 may be configured to: determine effective signals corresponding to an effective audio source and noise signals corresponding to a noise source and obtain determination results, at least according to the different audio signals respectively collected by the two audio collection devices.

The noise reduction module 1003 may be configured to: perform noise reduction on the different audio signals collected by two audio collection devices respectively to retain the effective signals and reduce the noise signals, according to the determination results.

In one embodiment, one of the two audio collection devices may be a built-in audio collection device of the electronic device, and another may be an audio collection device worn by the subject where the effective sound source is located.

In one embodiment, the determination module 1002 may be configured to:

determine one group of audio signals corresponding to each audio source from the different audio signals respectively collected by the two audio collection devices, where each group of audio signals may include different audio signals generated by a corresponding audio source in the two audio collection devices respectively; and determine a target group of audio signals with a largest amplitude variation between the audio signals collected by the two audio collection devices in each group of audio signals.

The target group of audio signals may be effective signals corresponding to the effective audio source. Other sets of audio signals except for the target group of audio signals may be the noise signals corresponding to the noise source.

In another embodiment, the determination module 1002 may be configured to:

obtain relative position information between the effective audio source and the two audio collection devices;

determine a distance ratio between distances of the effective audio source with respect to each of the two audio collection devices according to the relative position information;

according to the distance ratio, determine the amplitude variation characteristics that should exist between the effective signals of the effective audio sources collected by the two audio collection devices respectively;

determine one group of audio signals corresponding to each audio source from the different audio signals respectively collected by the two audio collection devices, where each group of audio signals may include different audio signals generated by a corresponding audio source in the two audio collection devices;

determine a target group of audio signals with a largest amplitude variation between the audio signals collected by the two audio collection devices in each group of audio signals.

The target group of audio signals may be effective signals corresponding to the effective audio source. Other sets of audio signals except for the target group of audio signals may be the noise signals corresponding to the noise source.

In one embodiment, the noise reduction module 1003 may be configured to:

perform a time alignment process on the different audio signals respectively collected by the two audio collection devices;

perform an inversion process on the waveforms of the second audio signals after the time alignment process, to obtain the second audio signals in the inverted waveform form; and perform a waveform superposition process on the second audio signals in the inverted waveform form and the first audio signals, to obtain the target audio signal.

The first audio signals and the second audio signals may be different audio signals respectively collected by the two audio collecting devices, and the effective signals in the first audio signals may have a higher amplitude than the effective signals in the second audio signals.

Figure 11:
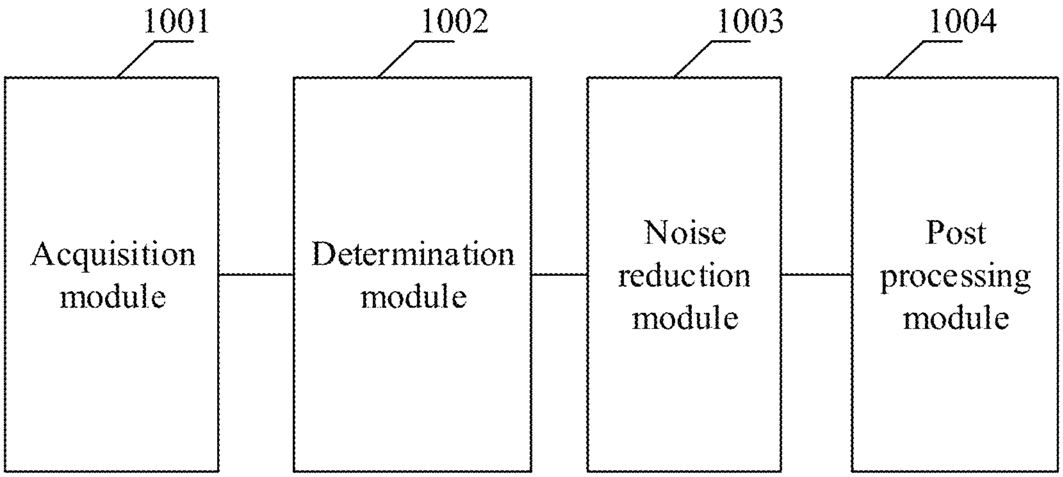
FIG. 11 illustrates another exemplary noise reduction device consistent with various disclosed embodiments in the present disclosure.

In one embodiment shown in FIG. 11, the device may further include a postprocessing module 1004.

The postprocessing module 1004 may be configured to amplify the target audio signal obtained by the noise reduction.

In another embodiment, the postprocessing module 1004 may be further configured to: perform the noise filtering process on the target audio signal, and/or perform the shaping process on the target audio signal, before amplifying the target audio signal obtained by the noise reduction.

In one embodiment, when being configured to perform the noise filtering process on the target audio signal, the postprocessing module 1004 may be specifically configured to:

determine whether there is a signal part whose amplitude is lower than a preset threshold value in the target audio signal; and when the signal part whose amplitude is lower than the preset threshold value exists, filter out the signal part whose amplitude is lower than the preset threshold value.

In one embodiment, when being configured to perform the shaping process on the target audio signal, the postprocessing module 1004 may be specifically configured to:

determine whether there is a signal part whose waveform satisfies an abnormal condition in the target audio signal; and when the signal part whose waveform satisfies the abnormal condition in the target audio signal exists, shape the signal part whose waveform satisfies the abnormal condition in the target audio signal.

For the convenience of description, when describing the above systems or devices, the functions are divided into various modules or units to be described separately. Of course, when implementing, the functions of each unit can be implemented in the same one or more software and/or hardware.

In the noise reduction method and device provided by the present disclosure, the different audio signals collected by the two audio collection devices (one of the two audio collection devices may have a specific positional relationship with the effective audio source) may be obtained. The effective signals corresponding to the effective audio source and the noise signals corresponding to the noise source may be determined to obtain determination results, at least according to the different audio signals respectively collected by the two audio collection devices. According to the determination results, the noise reduction may be performed on the audio signals collected by at least one of the two audio collection devices, to retain the effective signals and reduce the noise signals. The effect of noise reduction on the collected audio signals may be achieved, which may effectively improve the quality of the collected audio signals. Therefore, the quality of the voice communication in the voice communication scene may be improved.

The various embodiments of the present disclosure may be implemented by means of software plus a necessary general hardware platform. Based on this understanding, the technical solution of the present disclosure essentially or the part that contributes to the existing technology can be embodied in the form of a software product, and the computer software product can be stored in a storage medium, such as ROM/RAM, magnetic disk, CD-ROM, etc., including several instructions to enable a computer device (which can be a personal computer, server, or network device, etc.) to execute the method described in each embodiment of the present disclosure or some parts of the embodiments.

It should also be noted that in the present disclosure, relational terms such as first, second, third, and fourth are only used to distinguish one entity or operation from another entity or operation, and are not necessarily required or imply that there is any such actual relationship or order between these entities or operations. Moreover, the terms "include", "comprise" or any other variants thereof are intended to cover non-exclusive inclusion, so that a process, method, article or device including a series of elements may not only include those elements, but also may include those that are not explicitly listed elements, or elements inherent to this process, method, article or equipment. Without more restrictions, the element defined by the sentence "including a . . . " does not exclude the existence of other identical elements in the process, method, article, or equipment that includes the element Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A noise reduction method, comprising:

obtaining different audio signals respectively collected by two audio collection devices, wherein one of the two audio collection devices has a specific positional relationship with an effective audio source;

at least according to the different audio signals respectively collected by the two audio collection devices, determining effective signals corresponding to the effective audio source and noise signals corresponding to a noise source and obtaining determination results, wherein determining the effective signals and the noise signals corresponding to the noise source includes:

determining one group of audio signals corresponding to each audio source from the different audio signals respectively collected by the two audio collection devices, wherein each group of audio signals includes different audio signals generated by a corresponding audio source in the two audio collection devices respectively; and determining a target group of audio signals based on each group of audio signals, the target group of audio signals being the effective signals corresponding to the effective audio source, and determining the target group of audio signals including:

determining the target group of audio signals with a largest amplitude variation between the audio signals collected by the two audio collection devices in each group of audio signals; and performing a noise reduction process on the audio signals collected by at least one of the two audio collection devices to retain the effective signals and reduce the noise signals, according to the determination results.

2. The method according to claim 1, wherein:

one of the two audio collection devices is a built-in audio collection device of an electronic device, and another one of the two audio collection devices is an audio collection device worn by a principle object where the effective audio source is located.

3. The method according to claim 1, wherein other groups of audio signals except for the target group of audio signals are the noise signals corresponding to the noise source.

4. The method according to claim 1, wherein:

determining the effective signals corresponding to the effective audio source and the noise signals corresponding to the noise source includes:

obtaining relative position information between the effective audio source and the two audio collection devices;

determining a distance ratio between distances of the effective audio source with respect to each of the two audio collection devices according to the relative position information;

according to the distance ratio, determining the amplitude variation characteristics that should exist between the effective signals of the effective audio sources collected by the two audio collection devices respectively.

5. The method according to claim 1, wherein performing the noise reduction process on the audio signals collected by the at least one of the two audio collection devices to retain the effective signals and reduce the noise signals according to the determination results includes:

performing a time alignment process on the different audio signals respectively collected by the two audio collection devices;

performing an inversion process on waveforms of second audio signals after the time alignment process, to obtain the second audio signals in an inverted waveform form; and performing a waveform superposition process on the second audio signals in the inverted waveform form and first audio signals, to obtain target audio signals;

wherein:

the first audio signals and the second audio signals are different audio signals respectively collected by the two audio collecting devices, and the effective signals in the first audio signals have higher amplitude than the effective signals in the second audio signals.

6. The method according to claim 1, after performing the noise reduction process on the audio signals collected by the at least one of the two audio collection devices, further including:

amplifying target audio signals obtained by the noise reduction process.

7. The method according to claim 6, before amplifying the target audio signals obtained by the noise reduction process, further including:

performing a noise filtering process on the target audio signals; and/or performing a shaping process on the target audio signals.

8. The method according to claim 7, wherein performing the noise filtering process on the target audio signals includes:

determining whether there is a signal part having amplitude lower than a preset threshold value in the target audio signals; and when the signal part having amplitude lower than the preset threshold value exists, filtering out the signal part having amplitude lower than the preset threshold value.

9. The method according to claim 7, wherein performing a shaping process on the target audio signals includes:

determining whether there is a signal part whose waveform satisfies an abnormal condition in the target audio signals; and when the signal part whose waveform satisfies the abnormal condition exists in the target audio signals, shaping the signal part whose waveform satisfies the abnormal condition.

10. An electronic device, comprising:

a memory, configured to store program instructions for performing a noise reduction method; and a processor, coupled with the memory and, when executing the program instructions, configured to:

obtain different audio signals respectively collected by two audio collection devices, wherein one of the two audio collection devices has a specific positional relationship with an effective audio source;

at least according to the different audio signals respectively collected by the two audio collection devices, determine effective signals corresponding to the effective audio source and noise signals corresponding to a noise source and obtain determination results, wherein determining the effective signals and the noise signals corresponding to the noise source includes:

determining one group of audio signals corresponding to each audio source from the different audio signals respectively collected by the two audio collection devices, wherein each group of audio signals includes different audio signals generated by a corresponding audio source in the two audio collection devices respectively; and determining a target group of audio signals based on each group of audio signals, the target group of audio signals being the effective signals corresponding to the effective audio source, and determining the target group of audio signals including:

determining the target group of audio signals with a largest amplitude variation between the audio signals collected by the two audio collection devices in each group of audio signals; and perform a noise reduction process on the audio signals collected by at least one of the two audio collection devices to retain the effective signals and reduce the noise signals, according to the determination results.

11. The device according to claim 10, wherein:

one of the two audio collection devices is a built-in audio collection device of the electronic device, and another one of the two audio collection devices is an audio collection device worn by a principle object where the effective audio source is located.

12. The device according to claim 10, wherein other groups of audio signals except for the target group of audio signals are the noise signals corresponding to the noise source.

13. The device according to claim 10, wherein: when being configured to determine the effective signals corresponding to the effective audio source and the noise signals corresponding to the noise source, the processor is configured to:

obtain relative position information between the effective audio source and the two audio collection devices;

determine a distance ratio between distances of the effective audio source with respect to each of the two audio collection devices according to the relative position information;

according to the distance ratio, determine the amplitude variation characteristics that should exist between the effective signals of the effective audio sources collected by the two audio collection devices respectively.

14. The device according to claim 10, wherein, when being configured to perform the noise reduction process on the audio signals collected by the at least one of the two audio collection devices to retain the effective signals and reduce the noise signals according to the determination results, the processor is configured to:

perform a time alignment process on the different audio signals respectively collected by the two audio collection devices;

perform an inversion process on waveforms of second audio signals after the time alignment process, to obtain the second audio signals in an inverted waveform form; and perform a waveform superposition process on the second audio signals in the inverted waveform form and first audio signals, to obtain target audio signals;

wherein:

the first audio signals and the second audio signals are different audio signals respectively collected by the two audio collecting devices, and the effective signals in the first audio signals have higher amplitude than the effective signals in the second audio signals.

15. The device according to claim 10, wherein, after performing the noise reduction process on the audio signals collected by the at least one of the two audio collection devices, the processor is further configured to:

amplify target audio signals obtained by the noise reduction process.

16. The device according to claim 15, wherein, before amplifying the target audio signals obtained by the noise reduction process, the processor is further configured to:

perform a noise filtering process on the target audio signals; and/or perform a shaping process on the target audio signals.

17. The device according to claim 16, when being configured to perform the noise filtering process on the target audio signals, the processor is configured to:

determine whether there is a signal part having amplitude lower than a preset threshold value in the target audio signals; and when the signal part having amplitude lower than the preset threshold value exists, filter out the signal part having amplitude lower than the preset threshold value.

18. The device according to claim 16, when being configured to perform the shaping process on the target audio signals, the processor is configured to:

determine whether there is a signal part whose waveform satisfies an abnormal condition in the target audio signals; and when the signal part whose waveform satisfies the abnormal condition exists in the target audio signals, shape the signal part whose waveform satisfies the abnormal condition.

19. A non-transitory computer-readable storage medium, containing program instructions for, when executed by a processor, performing a noise reduction method, the method comprising:

obtaining different audio signals respectively collected by two audio collection devices, wherein one of the two audio collection devices has a specific positional relationship with an effective audio source;

at least according to the different audio signals respectively collected by the two audio collection devices, determining effective signals corresponding to the effective audio source and noise signals corresponding to a noise source and obtaining determination results, wherein determining the effective signals and the noise signals corresponding to the noise source includes:

determining one group of audio signals corresponding to each audio source from the different audio signals respectively collected by the two audio collection devices, wherein each group of audio signals includes different audio signals generated by a corresponding audio source in the two audio collection devices respectively; and determining a target group of audio signals based on each group of audio signals, the target group of audio signals being the effective signals corresponding to the effective audio source, and determining the target group of audio signals including:

determining the target group of audio signals with a largest amplitude variation between the audio signals collected by the two audio collection devices in each group of audio signals; and performing a noise reduction process on the audio signals collected by at least one of the two audio collection devices to retain the effective signals and reduce the noise signals, according to the determination results.

20. The storage medium according to claim 19, wherein: one of the two audio collection devices is a built-in audio collection device of the electronic device, and another one of the two audio collection devices is an audio collection device worn by a principal object where the effective audio source is located.

* * * * *